US008819773B2

(12) United States Patent
Banzhof

(10) Patent No.: US 8,819,773 B2
(45) Date of Patent: Aug. 26, 2014

(54) REMOTE SECURITY SELF-ASSESSMENT FRAMEWORK

(71) Applicant: iScan Online, Inc., Dallas, TX (US)

(72) Inventor: Carl Banzhof, Dallas, TX (US)

(73) Assignee: Iscan Online, Inc., Dallas, TX (US)

( * ) Notice: Subject to any disclaimer, the term of this patent is extended or adjusted under 35 U.S.C. 154(b) by 0 days.

(21) Appl. No.: 13/780,552

(22) Filed: Feb. 28, 2013

(65) Prior Publication Data

US 2013/0219460 A1    Aug. 22, 2013

Related U.S. Application Data

(63) Continuation of application No. 13/773,639, filed on Feb. 22, 2013.

(60) Provisional application No. 61/602,077, filed on Feb. 22, 2012.

(51) Int. Cl.
*H04L 29/06*    (2006.01)
*G06F 21/57*    (2013.01)

(52) U.S. Cl.
CPC .............. *G06F 21/577* (2013.01); *H04L 63/20* (2013.01); *H04L 63/1433* (2013.01)
USPC .............. 726/1; 726/4; 726/6; 726/7; 726/22; 726/23; 726/24; 726/25; 726/26; 713/188; 705/80

(58) Field of Classification Search
USPC ............................................................ 726/1
See application file for complete search history.

(56) References Cited

U.S. PATENT DOCUMENTS

| 7,451,488 | B2 * | 11/2008 | Cooper et al. .................. 726/25 |
| 8,056,130 | B1 * | 11/2011 | Njemanze et al. .............. 726/22 |
| 8,065,712 | B1 * | 11/2011 | Cheng et al. ...................... 726/1 |
| 8,234,705 | B1 * | 7/2012 | Roskind et al. ................. 726/22 |
| 8,234,710 | B2 * | 7/2012 | Wenzinger et al. ............. 726/24 |
| 8,281,019 | B1 * | 10/2012 | Woodard et al. .............. 709/228 |
| 8,590,046 | B2 * | 11/2013 | Baikalov et al. ................ 726/25 |
| 2003/0212779 | A1 * | 11/2003 | Boyter et al. ................. 709/223 |
| 2003/0229801 | A1 | 12/2003 | Kouznetsov et al. |

(Continued)

OTHER PUBLICATIONS

MITRE Corp., 'Open Vulnerability Assessment Language', 2004, MITRE Corp, entire document, http://www.robergewriting.com/documents/ovalbrochure_2004.pdf.*

(Continued)

*Primary Examiner* — Kambiz Zand
*Assistant Examiner* — Ronald Baum

(57) ABSTRACT

A system for security self-assessment for a computer platform. The system comprises a memory, a processor, and an application stored in the memory. When executed by the processor, the application in association with a call to action transmits security self-assessment logic and at least one security self-assessment policy to a computer platform, wherein the security self-assessment policy defines at least one scan tool to be used by the security self-assessment logic when executed on the computer platform to perform a security self-assessment of the computer platform. The system further comprises a plurality of scan tools stored in the memory and accessible for downloading by the computer platform. The security self-assessment logic is configured to cause a processor of the computer platform to download at least one scan tool defined by the security self-assessment policy and to perform a security self-assessment.

20 Claims, 7 Drawing Sheets

(56) References Cited

U.S. PATENT DOCUMENTS

| | | | |
|---|---|---|---|
| 2003/0231207 A1* | 12/2003 | Huang | 345/752 |
| 2005/0050335 A1* | 3/2005 | Liang et al. | 713/188 |
| 2006/0037079 A1 | 2/2006 | Midgley | |
| 2006/0161989 A1* | 7/2006 | Reshef et al. | 726/26 |
| 2007/0300286 A1* | 12/2007 | Judge | 726/1 |
| 2008/0005123 A1 | 1/2008 | Jung et al. | |
| 2009/0037496 A1* | 2/2009 | Chong et al. | 707/204 |
| 2009/0094222 A1 | 4/2009 | McColgan et al. | |
| 2009/0216868 A1* | 8/2009 | Gao et al. | 709/223 |
| 2009/0307753 A1* | 12/2009 | Dupont et al. | 726/3 |
| 2010/0058432 A1* | 3/2010 | Neystadt et al. | 726/1 |
| 2010/0235879 A1 | 9/2010 | Burnside et al. | |
| 2010/0241974 A1* | 9/2010 | Rubin et al. | 715/764 |
| 2010/0251000 A1* | 9/2010 | Lyne et al. | 714/2 |
| 2011/0214157 A1* | 9/2011 | Korsunsky et al. | 726/1 |
| 2013/0219460 A1 | 8/2013 | Banzhof | |
| 2013/0219493 A1 | 8/2013 | Banzhof | |

OTHER PUBLICATIONS

Nash, T., 'An Undirected Attack Against Critical Infrastructure', Vulnerability & Risk Assessment Program (VRAP) Lawrence Livermore National Laboratory, Case Study Series: vol. 1.2, Sep. 2005, entire document, http://ics-cert.us-cert.gov/sites/default/files/recommended_practices/CaseStudy-002.pdf.*

Banzhof, Carl, J., et al., Provisional Patent Application entitled "Remote Security Self-Assessment Framework", filed on Feb. 22, 2012, U.S. Appl. No. 61/602,077.

Banzhof, Carl, J., et al., Patent Application entitled "Remote Security Self-Assessment Framework", filed on Feb. 22, 2013, U.S. Appl. No. 13/773,639.

Banzhof, Carl, J., et al., PCT Application entitled "Remote Security Self-Assessment Framework", filed on Feb. 23, 2013, U.S. Appl. No. PCT/US13/27530.

Foreign Communication From a Related Counterpart Application—International Search Report and Written Opinion dated Nov. 26, 2013, PCT/US13/27530.

* cited by examiner

REMOTE SECURITY SELF-ASSESSMENT FRAMEWORK

CROSS-REFERENCE TO RELATED APPLICATIONS

This application is a continuation of and claims priority under 35 U.S.C. §120 to U.S. application Ser. No. 13/773,639, filed on Feb. 22, 2013, entitled, "Remote Security Self-Assessment Framework", by Carl Banzhof, which is a non-provisional application of and claims priority to U.S. Provisional Patent Application Ser. No. 61/602,077, filed on Feb. 22, 2012, entitled "Remote Security Self-Assessment Framework," by Carl Banzhof, et al., both of which are incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computers and computing devices are susceptible to a variety of security threats and/or vulnerabilities. Confidential information on a computer may be stolen by others, either through the efforts of intrusive malware or through failure on the part of the computer user to maintain the physical security of the computer. Executable programs or scripts may be covertly installed on the computer, for example in the form of a Trojan embedded in a free downloaded application. These covertly installed programs or scripts may execute and cause harm or loss of service to the computer. These covertly installed programs or scripts may execute and perform illegitimate and/or illegal actions on behalf of others unassociated with the computer, for example those who covertly installed the programs or scripts on the computer.

To promote computer security, enterprises may execute security checks on computers connected to their internal or private networks. The security checks may involve installing and/or updating malware detection applications such as virus detection applications on these computers connected to their internal network. As security threats evolve, the enterprise may transmit updated security applications and/or patches to the computers connected to their private network to address the evolving security threats. These enterprises may provide firewalls at the point where their private networks connect to the Internet or public networks.

Credit card institutions may impose security rules and regulations on retailers who collect payment for goods and services paid for by their customers with credit card. To assure compliance with the security rules, the credit card institutions may require periodic auditing of the retailers. Retailers may be stratified into different classes or merchant categories based on a number of credit card transactions per unit of time. Different rules and/or auditing procedures may be imposed on the retailer based on their classification level.

SUMMARY

In an embodiment, a system for security self-assessment of a computer platform is disclosed. The system comprises a memory, a processor, and an application stored in the memory. When executed by the processor and in association with a call to action, the application transmits security self-assessment logic and at least one security self-assessment policy to a computer platform, wherein the security self-assessment policy defines at least one scan tool to be used by the security self-assessment logic when executed on the computer platform to perform a security self-assessment of the computer platform. The system further comprises a plurality of scan tools stored in the memory and accessible for downloading by security self-assessment logic when executed on the computer platform. The security self-assessment logic is configured to cause a processor of the computer platform to download to the computer platform the at least one scan tool defined by the security self-assessment policy from the plurality of scan tools stored in the memory, to perform a security self-assessment of the computer platform based at least in part on the downloaded at least one scan tool, to remove the at least one downloaded scan tool from the computer platform, to remove the security self-assessment policy from the computer platform, and to remove the security self-assessment logic from the computer platform when the self-assessment of the computer platform has performed.

In an embodiment, a method of computer security self-assessment is disclosed. The method comprises copying to a computer one of a security self-assessment plug-in into a browser stored in the computer or a security self-assessment native mobile application and executing by the computer one of the security self-assessment plug-in or the security self-assessment native mobile application. When the security self-assessment plug-in is executed the plug-in invokes at least one scan tool selected from a vulnerability assessment engine, an anti-malware engine, a data discovery engine, a registry check tool, a file check tool, a system level analysis tool, and a window management inquiry tool, wherein the invoked at least one scan tool executes on the computer. When the security self-assessment native mobile application is executed, the native mobile application invokes at least one scan tool selected from a vulnerability assessment engine, an anti-malware engine, a data discovery engine, a registry check tool, a file check tool, a system level analysis tool, and a window management inquiry tool, wherein the invoked at least one scan tool executes on the computer. The method further comprises transmitting results of executing the at least one scan tool to a remote computer that determines a security status of the computer based on the transmitted results.

In an embodiment, a method of computer security self-assessment is disclosed. The method comprises executing a remote monitoring and management (RMM) agent on a computer, downloading by the remote monitoring and management agent a security self-assessment logic from a remote computer. The method further comprises downloading by the security self-assessment logic at least three security assessment tools selected from an anti-malware engine, a data discovery engine, a registry check tool, a file check tool, a system level analysis tool, a window management inquiry tool, or a vulnerability assessment engine from a data store of downloadable security assessment components, based at least in part on a security self-assessment policy. The method further comprises executing at least three security assessment tools by the self-assessment logic and transmitting results of executing the at least three security assessment tools by the self-assessment logic to the remote computer.

In an embodiment, a system for security self-assessment for a computer is disclosed. The system comprises a memory, a processor, and an application stored in the memory. When executed by the processor, the application in association with a call to action transmits security self-assessment logic and at least one security self-assessment policy to a computer platform, wherein the security self-assessment policy defines at least one scan tool to be used by the security self-assessment logic when executed on the computer platform to perform a security self-assessment of the computer platform. The system further comprises a plurality of scan tools stored in the memory and accessible for downloading by the computer platform.

In an embodiment, a method of computer security self-assessment is disclosed. The method comprises copying by a computer a security self-assessment plug-in into a browser stored in the computer and executing the security self-assessment plug-in by the computer, wherein the plug-in invokes at least one scan tool selected from an anti-malware engine, a data discovery engine, a registry check tool, a file check tool, a system level analysis tool, and a window management inquiry tool, wherein the invoked scan tools execute on the computer. The method further comprises transmitting results of executing the at least one scan tool to a remote computer that determines a security status of the computer based on the transmitted results.

In an embodiment, another method of computer security self-assessment is disclosed. The method comprises executing a remote monitoring and management (RMM) agent on a computer and downloading by the remote monitoring and management agent a security self-assessment logic from a remote computer. The method further comprises downloading by the security self-assessment logic at least one scan tool from a data store of downloadable security scanning components, based at least in part on a security self-assessment policy, executing at least one downloaded scan tool by the self-assessment logic, and transmitting results of executing the at least one downloaded scan tool by the self-assessment logic to the remote computer, whereby the computer performs a security self-assessment.

In another embodiment, another method of computer security self-assessment is disclosed. The method comprises copying by a computer a security self-assessment native application to the computer and executing the security self-assessment native application by the computer, wherein the security self-assessment native application invokes at least one scan tool selected from an anti-malware engine, a data discovery engine, a registry check tool, a file check tool, a system level analysis tool, and a window management inquiry tool, wherein the invoked scan tools execute on the computer. The method further comprises transmitting results of executing the at least one scan tool to a remote computer that determines a security status of the computer based on the transmitted results.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
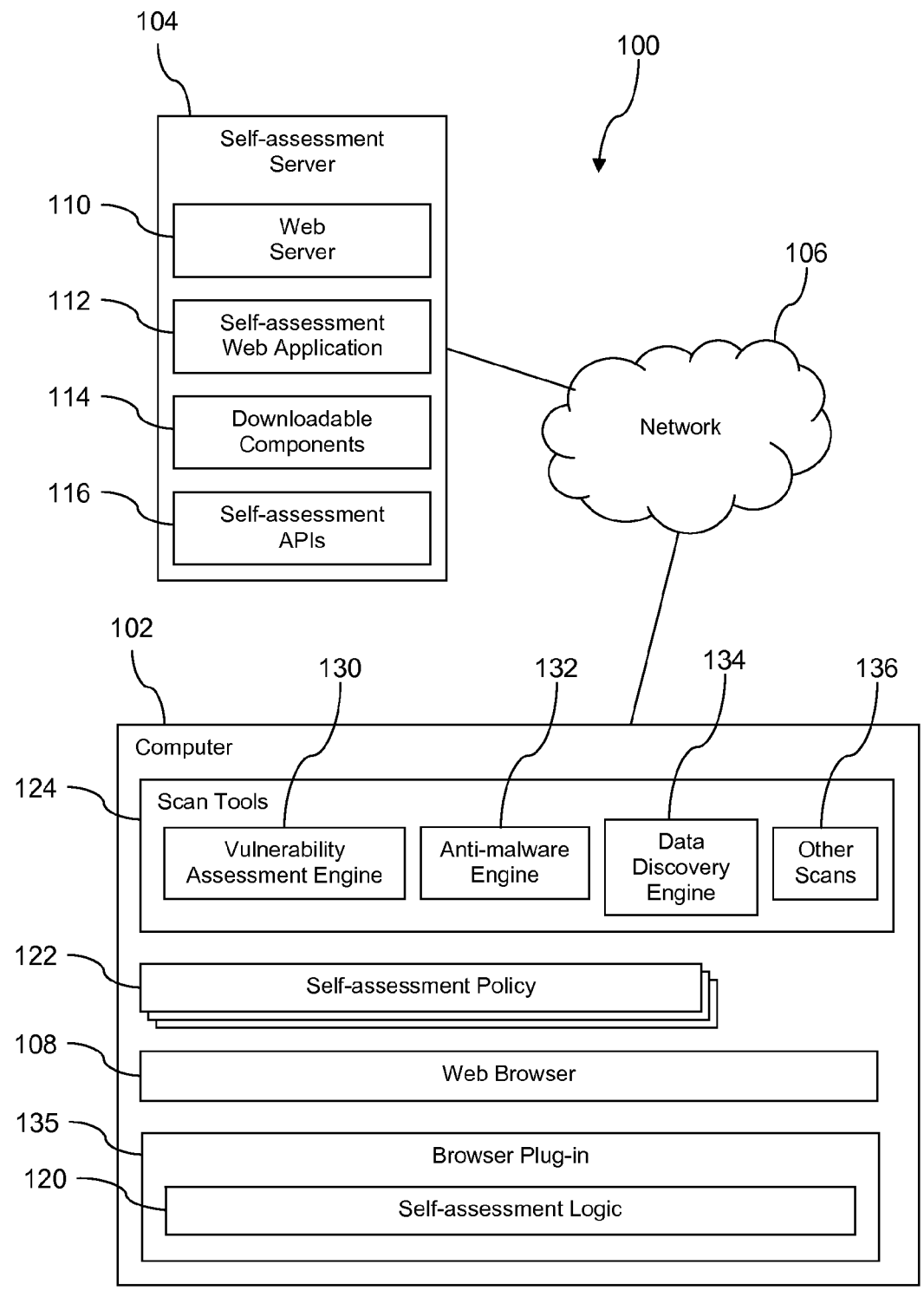
FIG. 1A is an illustration of a self-assessment system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Computer security risks and/or threats seem to increase all the time. Regulatory compliance schemes recognize this. The Payment Card Industry (PCI) Council has made it mandatory that internal security scans of network endpoints be conducted regularly and vulnerabilities and risks be prioritized. Health Insurance Portability and Accountability Act (HIPAA) regulations have mandated security scanning of network endpoints.

Many computer security assessments are implemented by a security application that executes on a centrally located computer or server. The application executing on the server maintains centralized control over and oversight of the security assessment process. The server may interact with each computer connected to a private network one after another or in some kind of parallel fashion, but in either case the security assessment may be initiated and executed centrally. A variety of shortcomings may be associated with this traditional approach. In the contemporary technology environment including branch offices, remote workers, bring-your-own-devices (BYODs), transient users, and mobile users, increasingly computers that connect to enterprise networks connect intermittently and/or periodically, which may be referred to as transient presence. Because of transient presence of computers and/or personal electronic devices on and/or connected to enterprise networks, it may become problematic for the centralized security assessment software to perform security scans and/or security assessments of such computers. Some of the computers may not comply with any standard hardware or software configuration, and the centralized security assessment software may be challenged to know how to scan unconventionally configured computers. Additionally, the security assessment executed centrally on a computer system remote from the computer being assessed may be hampered by access privilege limitations granted to a remote machine. Said in other words, the computer being scanned and/or assessed may restrict the access privileges of the server executing the assessment logic, thereby limiting the thoroughness of the security assessment of the computer being scanned. Ironically, these access restrictions that hamper security assessment may be imposed by the computer being scanned in compliance with desirable security policies Further, in some cases, for example a business comprising a large number of franchise locations, such as convenience stores, network connections of computers remotely located at the franchise location may be slow, thereby slowing the centrally processed security assessment that takes place over the slow network connections. In the case of assessing the compliance of retailers or merchants with credit card transaction security regulations, the security assessment process may be forbiddingly expensive for small merchants, for example category 4 merchants. These small merchants may need to pay upwards of $1500 per day to engage a contractor to certify their compliance with the credit card transaction security requirements, for example compliance with the payment card industry (PCI) compliance standard.

The present disclosure teaches a computer security self-assessment system and/or framework. Rather than implementing a centrally executed computer security assessment, the present disclosure teaches distributing computer security self-assessment software tools to the subject computer device or to a storage device accessible to the computer device, performing a security self-assessment by executing security self-assessment logic on the subject computer, and sending results of the security self-assessment to a self-assessment server computer. For example, in an embodiment, security assessment logic is installed on the subject computer; the assessment logic is invoked to execute on the subject computer; the assessment logic downloads one or more security scanning tools; the assessment logic invokes the one or more downloaded security scanning tools; and the assessment logic sends the results of executing the one or more downloaded security scanning tools to the self-assessment server computer. In an embodiment, as an alternative to installing the security assessment logic on the subject computer (e.g., in the memory of the computer itself), the security assessment logic may be installed on a memory device accessible to the subject computer, for example stored on a shared drive accessible to the computer. In this embodiment too, however, the instructions implementing the security assessment logic are read out of the memory device accessible to the subject computer and executed by the processor of the subject computer. This may be referred to in some contexts as opportunistic scanning, because the security scanning takes place at a time that is opportune for the subject computer whose security status is being assessed, for example at a time when the subject computer is attempting to connect to the enterprise network, at a time when the subject computer is attempting to access an enterprise application via a web server interface, or at a time when a remote monitoring and management (RMM) agent installed on the subject computer is called to action by a central remote monitoring and management server application.

A security self-assessment application executing on the self-assessment server computer may create a security self-assessment report about the subject computer (e.g., the computer that is the target of the security self-assessment) based on the results sent by the subject computer and provides this computer security self-assessment report to stakeholders. A stakeholder may be a variety of individuals or roles, for example an information technology department employee in charge of administering enterprise security policies, a government employee responsible for tracking the compliance with government security policies by other government employees, an employee of a trusted service manager who is responsible for tracking compliance of retail merchants with a payment card industry (PCI) security policy, and other persons responsible for monitoring compliance with computer security policies. It is understood that the term self-assessment refers to performing instructions on the subject computer or device the results of which are indicative of a security status and/or a security vulnerability of the computer or device. The determination of a pass or fail status may be made by the self-assessment server computer based on the subject computer or device forwarding the results of the self-assessment instructions. Alternatively, in an embodiment, the security assessment logic executing on the subject computer may generate the report based on the results of the security assessment and transmit this report to the self-assessment server computer and/or to stakeholders.

A variety of actions may be taken as a result of the pass or fail status of the self-assessment, depending on how the call to action is issued to the subject computer and/or depending on the manner in which the self-assessment tools are distributed to the subject computer. In some cases security tokens may be invalidated or deleted if the subject computer fails the security self-assessment. The subject computer may be refused access to an enterprise application in another case if the subject computer fails the security self-assessment. The self-assessment server may request that the subject computer and/or an internet protocol address associated with the subject computer be added to a black list of a firewall, for example a firewall protecting access to an enterprise network. The self-assessment server further may take action, if appropriate, to address security shortcomings identified during the security self-assessment. For example, the self-assessment server may provide instructions to the subject computer on how to correct a security vulnerability of the subject computer, for example by sending email instructions to a user of the subject computer and/or presenting them on a display of the subject computer. Yet other actions may result from the security self-assessment.

It is understood that a variety of different embodiments for deploying this functionality are contemplated, including but not limited to a web browser plug in, a native mobile application, a command line interface, and a remote monitoring and management (RMM) tool. For example, a user attempts to access an enterprise application via a web browser on a bring-your-own-device (BYOD) computer. The enterprise application requests the user to approve installation of a browser plug-in on their device. When the browser plug-in has been installed or downloaded to the device, the enterprise application then redirects the user's browser to a universal reference locator (URL) associated with security scanning, the browser plug-in is invoked and executes, the browser plug-in downloads one or more scan tools, the browser executes the one or more scan tools, and the one or more scan tools scan the device and/or other security self-assessment procedures are executed on the device, and the security status of the device is determined. In an embodiment, the one or more scan tools may execute with the access privileges of a local user of the subject computer. In an embodiment, the browser plug-in may first download one or more security policies, and the security policies may instruct the browser plug-in on what scan tools to download and execute.

The browser plug-in may comprise self-assessment instructions or it may fetch these instructions from a self-assessment server computer at the time of execution. These self-assessment instructions may be provided in the form of one or more separate security scanning tools as described further herein after. If the device passes the security self-assessment, the device then proceeds to access the enterprise application.

After the completion of the security self-assessment, the scan tools, the security policies, and/or security self-assessment instructions may be deleted from the device. In some cases, the scan tools may be removed before the completion of the security self-assessment, for example after a first scan tool completes executing, the first scan tool may be deleted or removed from the device and then a second scan tool may execute. In an embodiment, the second scan tool may be downloaded after the first scan tool has been deleted. Alternatively, in some cases, some or all of the scan tools and/or security self-assessment instructions may remain stored on the device. When the security self-assessment is performed later, a comparison between the versions and/or dates of the earlier installed executable tools locally stored on the subject computer may be compared to the versions and/or dates of the associated executable tools stored in the repository. A locally stored executable tool that is out of date may be replaced by a newly downloaded version of the specific executable tool, while other locally stored executable tools that are still current need not be downloaded over the slow network connection, thereby saving time.

This kind of security self-assessment may provide more accurate results than the assessment results provided by centrally executed security assessments. The self-assessment approach to local security assessment may be able to determine first hand from a device its security configuration, by contrast with a centralized type of security assessment which may rely primarily on remote inspection of network traffic or network packets. For example, the self-assessment may run having credentialed privileges on the computer device and as such may have access to aspects of the subject computer that are not accessible to a centralized security assessment application that accesses the computer device via a network communication link. When a centralized security assessment application attempts to perform such a credentialed scan (logon remotely to the computer device) it may be impracticable for the centralized application to obtain the appropriate credentials and or access privileges to logon to the computer device, especially when the computer device is not directly managed or owned by the enterprise that initiates the centralized security assessment. This security self-assessment taught herein may reduce security compliance auditing expenses for small businesses, for example for category 4 merchants.

Turning now to FIG. 1A, FIG. 1B, FIG. 1C, and FIG. 1D a computer security self-assessment system 100 is described. It should be understood that the differences between the systems illustrated in FIG. 1A, FIG. 1B, FIG. 1C, FIG. 1D are substantially limited to the manner in which a call-to-action for performing a self-assessment on a computer system is initiated and the entity that interworks with a centralized self-assessment server to mediate the self-assessment. Thus, the systems share many behaviors and similarities, once the description passes beyond the specific manner of issuing the call-to-action and initially launching a self-assessment.

With reference to FIG. 1A, in an embodiment, the system 100 comprises a computer device 102, a self-assessment server 104, and a network 106 that promotes electronic communication between the computer 102 and the self-assessment server 104. The computer 102 is the subject or target of the computer security self-assessment taught herein. The computer 102 may be any of a personal computer, a laptop computer, a tablet computer, a notebook computer, a mobile phone, a personal digital assistant, a server computer, or other computing device that may establish data communications via the network 106. The network 106 may be any combination of private and public networks.

In an embodiment, the functionality and access to information that is discussed hereinafter as being provided by the self-assessment server 104 may be provided by a self-assessment support service delivered using computing resources accessed via the network 106. While a single self-assessment server 104 is illustrated in FIG. 1A, it is understood that any number of self-assessment servers may be used to provide the subject functionality. The self-assessment server 104 may be implemented as a single computer or by a plurality of computers. Computers are described further hereinafter.

While a single computer 102 is illustrated in FIG. 1A and described below, it is understood that the system 100 is expected to provide similar computer self-assessment functionality to a plurality of computers 102. In an embodiment, the plurality of computers 102 need not be substantially similar to each other. In an embodiment, the plurality of computers 102 may include computers that are markedly different from each other. For example, some of the computers 102 may be server computers and others of the computers 102 may be tablet computers. Some of the computers 102 may be server computers and others of the computers may be point-of-sale terminals in convenience stores. In an embodiment, some of the computers 102 may be associated with a first enterprise while others of the computers 102 may be associated with a second and different enterprise. Thus, it is contemplated that the self-assessment server 104 may be used to support security self-assessment activities by computers 102 associated with different enterprises at the same time.

In an embodiment, a user of the computer 102 may activate a control provided on a user interface coupled to the computer 102 that uses a uniform resource locator (URL) or other reference to request self-assessment documents from the self-assessment server 104. Alternatively, the URL may be embedded in an email sent to the computer 102, and a user of the computer 102 may click on the URL embedded in the email. The computer self-assessment control may trigger a web browser 108 installed on the computer 102 to send a request to a URL link that references a web server 110 hosted by the self-assessment server 104 and/or otherwise references content accessible via the web server 110. Alternatively, the web server 110 may be hosted on a different computer platform from the self-assessment server 104.

The web server 110, in response to the request from the computer 102, invokes a self-assessment web application 112 on the self-assessment server 104. The self-assessment web application 112 provides a self-assessment browser plug-in and an optional self-assessment policy that the web server 110 returns to the computer 102 via the network 106. In an embodiment, an application that is not specifically a web application may provide the functionality described as being provided by the self-assessment web application 112.

In response to the content received by the web browser 108 from the web server 110, the computer 102 installs a browser plug-in 135, for example a security self-assessment browser plug-in, and an optional self-assessment policy 122. The browser plug-in comprises a self-assessment logic 120 that comprises executable instructions to perform security self-assessment and/or to invoke security assessment instructions provided by other security assessment procedures, functions, programs, or tools. The self-assessment logic 120 may be referred to as security self-assessment logic in some contexts. In an embodiment, a plurality of self-assessment policies 122 may be stored in the computer 102. The self-assessment policies 122 may be referred to as security self-assessment policies in some contexts. The self-assessment logic 120 then executes. The self-assessment logic 120 determines a configuration of the computer 102. For example, the self-assessment logic 120 may determine an operating system type and version installed on the computer. The self-assessment logic 120 may determine a hardware and/or firmware configuration of the computer 102. The self-assessment logic 120 may determine applications and application versions that are installed on the computer 102. This determination of the configuration of the computer 102 by the self-assessment logic 120 may be referred to in some contexts as a configuration survey.

The self-assessment logic 120 may read the one or more self-assessment policy 122 to determine the scope of the computer security self-assessment to be performed. In an embodiment, a single self-assessment policy 122 may articulate a plurality of actions or scans to perform; alternatively, each self-assessment policy 122 may articulate a single action or scan to perform. It is understood that the information that is described to be contained in the self-assessment policy 122 may alternatively be embedded in the self-assessment logic 120 itself, in which case the self-assessment policy 122 may not be installed. The scope of the computer security self-assessment may identify security assessment operations to be performed at an abstract level. For example, the scope may indicate that a computer virus scan is to be completed and a scan for confidential information such as a plurality of credit card numbers stored in the computer 102 is to be completed.

The self-assessment logic 120 may then request one or more scan tools from the web server 110 based on the analysis of the scope of the self-assessment. The request may identify the scan tools as abstract functions such as virus scan, a primary account number scan, a social security number scan, a medical records scan, and others. The request may comprise information that identifies the configuration of the computer 102, as determined by the self-assessment logic 120 during the configuration survey of the computer 102 described above. The self-assessment web application 112 may identify the appropriate self-assessment tools and/or scan tools based on the configuration information and retrieve these tools from a downloadable components store 114. In some contexts, the downloadable components store 114 may be referred to as a data store of downloadable security assessment components. The downloadable components store 114 may be implemented in a memory of the self-assessment server 104 and/or by a data store implemented on another computer that the self-assessment server 104 may access, for example via the network 106. The web server 110 returns the selected tools to the self-assessment logic 120.

In an embodiment, some or all of the scan tools may be retrieved from a plurality of sites rather than from a single, centralized repository. The downloadable components store 114 may be implemented as a distributed data store implemented by a plurality of separate and possibly unrelated server computers. The downloadable components store 114 may be implemented, in part, as a data store implemented by one or more third parties. For example, a first data store managed by a financial institution may provide scan tools associated with their credit cards, and a second data store managed by an electronic coupon management third party may provide scan tools associated with electronic coupons.

The self-assessment logic 120 installs one or more scan tools 124 received from the web server 110 onto the computer 102, for example into a random access memory (RAM) or other memory of the computer 102. In an embodiment, the self-assessment logic 120 may comprise opportunistic scanning logic; the self-assessment policy 122 may comprise an opportunistic scanning policy; and the scan tools 124 may comprise one or more opportunistic scan tools. In an embodiment, the browser plug-in 135 may comprise an opportunistic scanning browser plug-in and/or opportunistic scanning functionality. In an embodiment, the native mobile application may comprise an opportunistic scanning native mobile application and/or opportunistic scanning functionality. In an embodiment, the remote monitoring and management agent may comprise an opportunistic scanning remote monitoring and management agent and/or opportunistic scanning remote monitoring and management agent functionality. In some contexts the scan tools 124 may be referred to as security scanning tools or security assessment tools.

These scan tools 124 may provide for registry checks, file checks, system level analysis, and window management inquiry (WMI) queries to determine stored files, configuration settings, hardware versions, software versions, systems versions, and the like. For example, the scan tools 124 may comprise one or more vulnerability assessment engines 130, for example an open vulnerability assessment language (OVAL) engine. An OVAL engine may provide standard security compliance checks that are defined by a variety of enterprises or government agencies, for example checks that are mandated for use by qualified contractors or sub-contractors. In an embodiment, the executable software incorporated in the one or more vulnerability assessment engines 130 may be provided by one or more of enterprises, government agencies, credit card issuers, and/or financial services institutions. It is understood that a variety of computer security assessment tools may be delivered via the one or more vulnerability assessment engines 130. The scan tools 124 may comprise one or more data discovery engines 134. The data discovery engine 134 may comprise a primary account number (PAN) scanner to detect credit card numbers stored in a memory of the computer 102. The data discovery engine 134 may comprise other engines for discovering other kinds of confidential information stored on the computer 102, for example for discovering social security numbers (SSNs) medical records, passwords, and other confidential information. The scan tools 124 further may comprise an anti-malware engine 132 and other scan tools 136. It is understood that any of the scan tools 124 may be delivered as two or more components that provide the described functionality through collaboration. Likewise, two or more of the scan tools 124 described and/or illustrated as being separate components may be encapsulated in a single component or tool providing the like described functionality.

The anti-malware engine 132 may be configured to detect, identify, and/or remedy malware that may be present on the computer 102. The anti-malware engine 132 may incorporate anti-virus software. The anti-malware engine 132 may incorporate other software and/or scripts to detect, identify, and/or remedy malware installed on the computer 102. The data discovery engine 134 may identify patterns of data stored in the computer 102 that may be indicative of improper handling of confidential information, for example storing credit card numbers and/or authorization numbers on the computer 102. Yet other security scan tools 136 may be installed on the computer 102.

The self-assessment logic 120 may invoke one or all of the installed scan tools 124. One or more of the scan tools 124 may be executed with permissions of a local user of the computer 102. It is understood that, in an embodiment, instructions executed on the computer 102 with the permissions of a local user, for example instructions of the one or more scan tools 124, may provide greater access to the memory, the file system, and/or the operating system commands of the computer 102 than would instructions executed with the more limited access privileges of a remote user, for example of a centralized security assessment application executing on a remote computer. In an embodiment, the scan tools 124 may not be configured to access some of the applications of the computer 102. In an embodiment, self-assessment application programming interfaces (APIs) 116 stored with the downloadable components store 114 may be transmitted to the self-assessment logic 120 and made available to the executing scan tools 124. In an embodiment, the self-assessment APIs 116 may be used to promote integration with third party security assessment tools. For example, a network access control system could leverage an API to scan a device entering the network 106. The APIs 116 may be used for third party authentication and data transfer from interested collaborators and/or partners. The scan tools 124 may provide their results in a variety of different forms back to the self-assessment logic 120. The self-assessment logic 120 provides these results back to the self-assessment server 104 and/or the self-assessment web application 112.

In an embodiment, the self-assessment web application 112 collates and summarizes the results of the security self-assessment of the computer 102 and generates a report comprising these results. In an embodiment, the self-assessment web application 112 may transmit the report to one or more stakeholders, for example to a home office of a franchise company, to a payment card institution (PCI) auditing agent, to an enterprise security management platform, or other. The self-assessment web application 112 may set or delete security tokens on the computer 102 and/or in an enterprise network that the computer 102, for example tokens that may be used to access privileged information and/or privileged networks. For example, if the self-assessment indicates that the computer 102 exceeds a predefined vulnerability threshold, the self-assessment web application 112 may delete network security tokens used to access an enterprise network. It may be necessary to have the computer 102 rebuilt, for example a hard drive erased and operating system and applications reinstalled, to overcome the identified vulnerabilities before providing the subject network security tokens to the computer 102.

When the computer security self-assessment has completed, the self-assessment logic 120 may delete or otherwise unload the scan tools 124 and the self-assessment policy 122 from the computer 102. The self-assessment logic 120 may then uninstall and/or unload itself from the computer 102. In an embodiment, the self-assessment logic 120 may delete the scan tools and/or the self-assessment policies 122 in a rolling fashion, executing a first scan tool 124 defined by a first self-assessment policy 122, delete the first scan tool 124 and the first self-assessment policy 122, executing a second scan tool 124 defined by a second self-assessment policy 122, and deleting the second scan tool 124 and the second self-assessment policy 122. In an embodiment, the self-assessment logic 120 may download, execute, and delete scan tools 124 and associated self-assessment policies 122 in a rolling fashion.

Alternatively, in an embodiment, one or more of the self-assessment logic 120, the self-assessment policy 122, and/or the scan tools 124 may be retained in the memory of the computer 102, for example to reduce network traffic load during future self-assessments. The self-assessment process may include tests for determining if any self-assessment components stored on the computer 102 are outdated and for replacing any outdated stored self-assessment components during a future self-assessment action.

The self-assessment functionality described above with reference to FIG. 1A as being supported by a browser plug-in can be delivered through different user experiences, for example through a native mobile application experience, through a command line experience, and through a remote monitoring and management (RMM) experience. A native mobile application is substantially similar to the web browser plug-in experience described above with reference to FIG. 1A, except that the native mobile application is implemented specifically for the operating system of the computer 102 and/or for the specific platform of the computer 102. For example, a native mobile application may be implemented for an Android operating system and may make system calls to the Android operating system functions. Alternatively, the native mobile application may be implemented for an Apple IOS operating system and may make system calls to the IOS operating system.

Figure 1B:
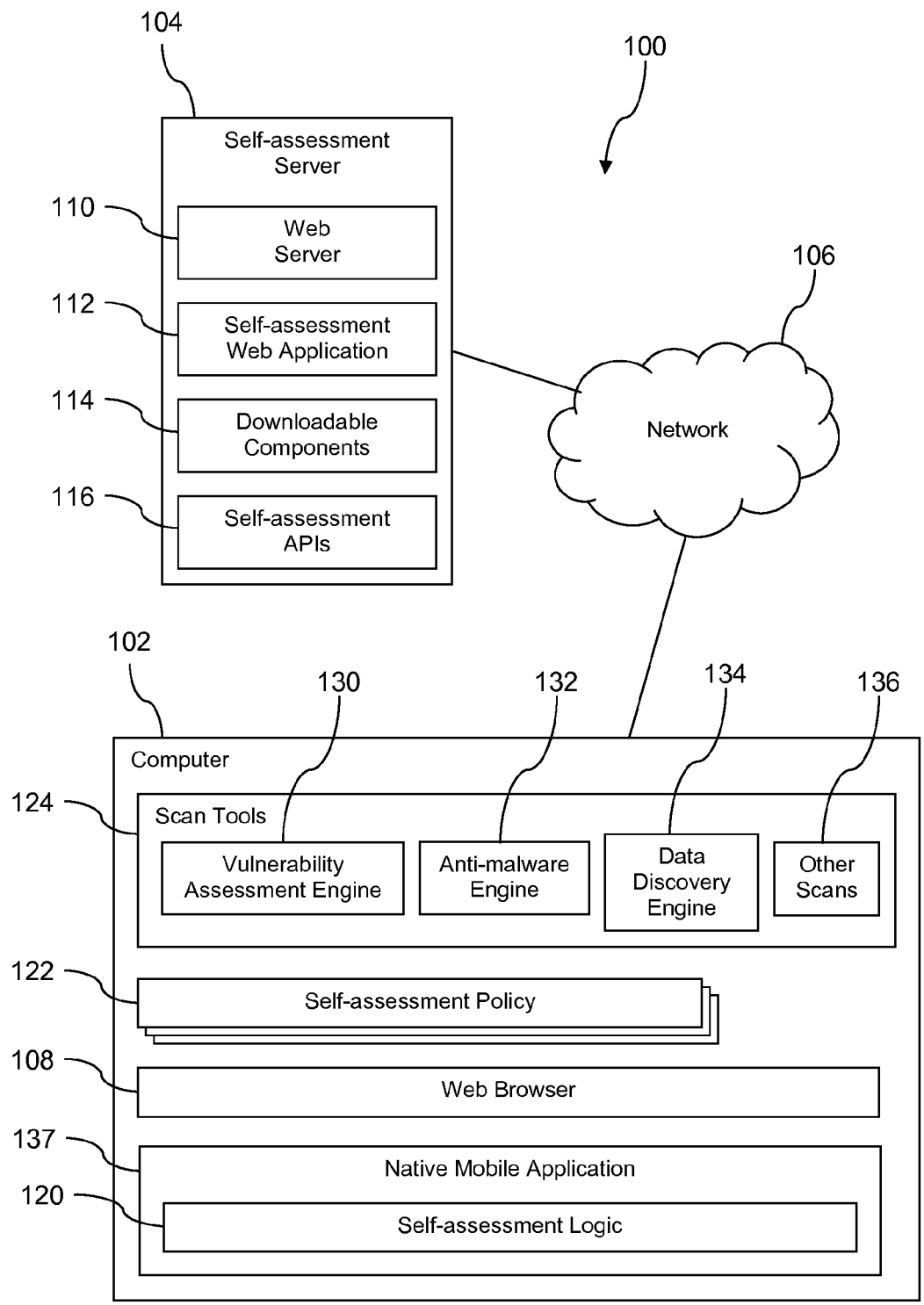
FIG. 1B is an illustration of another self-assessment system according to an embodiment of the disclosure.

In FIG. 1B, the system 100 is depicted wherein the self-assessment logic 120 is provided via a security self-assessment native mobile application 137 of the computer 102. For example, the browser 108 may access a web page, such as the enterprise web page providing access to the enterprise network and/or enterprise hosted applications. Such an enterprise host application that is accessed via a web page may be referred to as a web application or a web app. In an embodiment, the web application may be configured and/or designed to detect, via the web browser 108, if the security self-assessment native mobile application 137 is installed on the computer 102. In the case that the security self-assessment native mobile application 137 is not installed, the web application will redirect the web browser 108 and/or the computer 102 to an appropriate web store (e.g., the downloadable components store 114) and to download and install the subject security self-assessment native mobile application 137. It is understood that the web application and/or the web browser 108 may identify the specific security self-assessment native mobile application 137 to download based at least in part on information about the computer 102, for example an operating system installed on the computer 102, a model of the computer 102, a software version of the computer 102, a hardware version of the computer 102, and like individual information about the computer 102. The security self-assessment native mobile application 137 is then executed to perform a security self-assessment of the computer 102. In an embodiment, the security self-assessment native mobile application 137 may be an opportunistic security self-assessment native mobile application or an opportunistic scanning native mobile application.

Figure 1C:
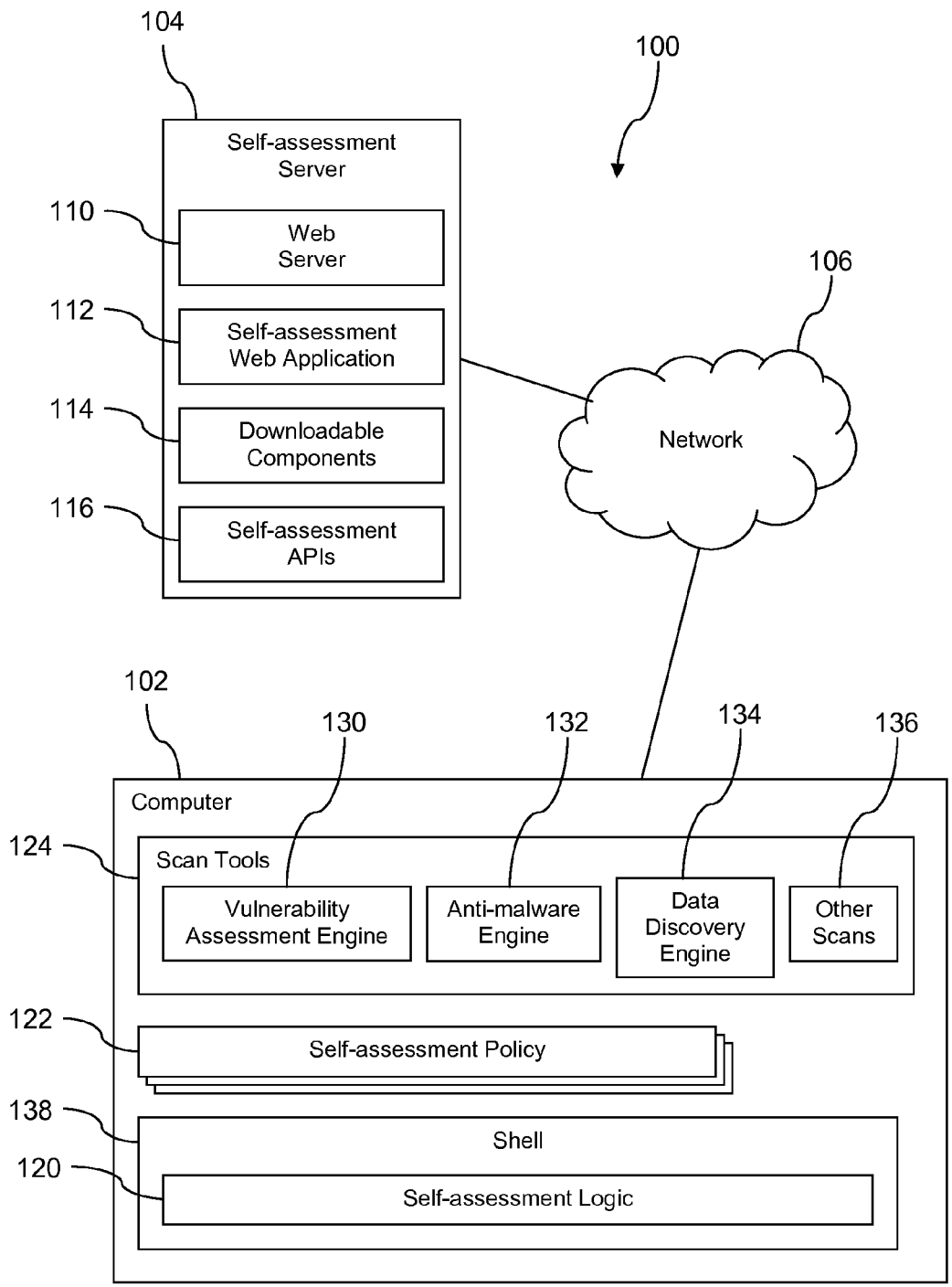
FIG. 1C is an illustration of yet another self-assessment system according to an embodiment of the disclosure.
Figure 1D:
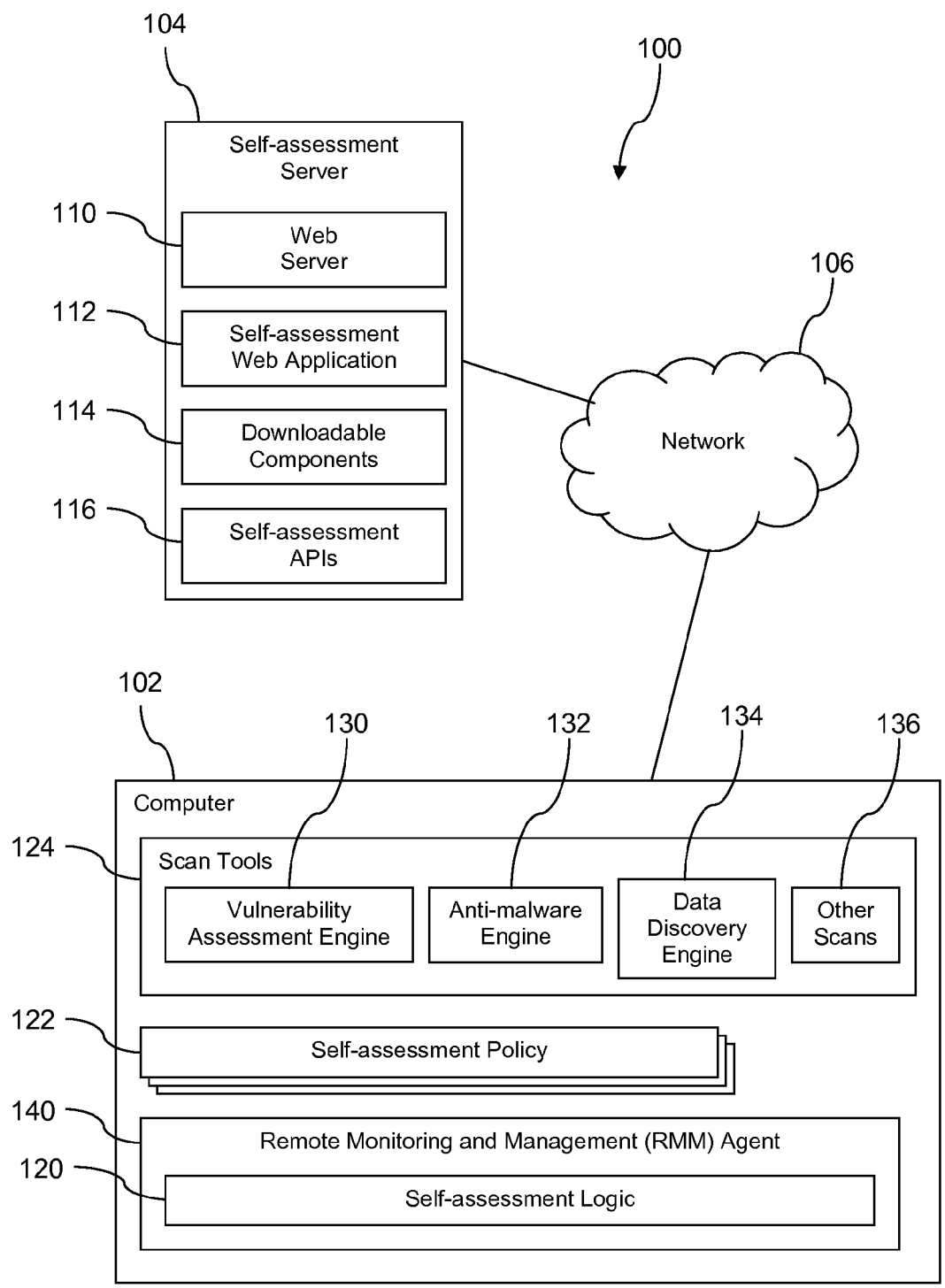
FIG. 1D is an illustration of yet another self-assessment system according to an embodiment of the disclosure.

In FIG. 1C, the system 100 is depicted wherein the self-assessment logic 120 is provided via a command line experience within a shell 138 of the computer 102. The user may execute a command line through the shell 138 provided by the computer 102. The self-assessment logic 120 may receive a call to action from a specific command of the shell or from any shell command, for example according to a periodic schedule for performing security self-assessments. In FIG. 1D, the system 100 is depicted wherein the self-assessment logic 120 is provided via a remote monitoring and management (RMM) agent 140. For example, the self-assessment logic 120 embedded in and/or coupled to the remote monitoring and management agent 140 may be accessed or initiated by a call to action from a remote monitoring and management server.

Figure 2:
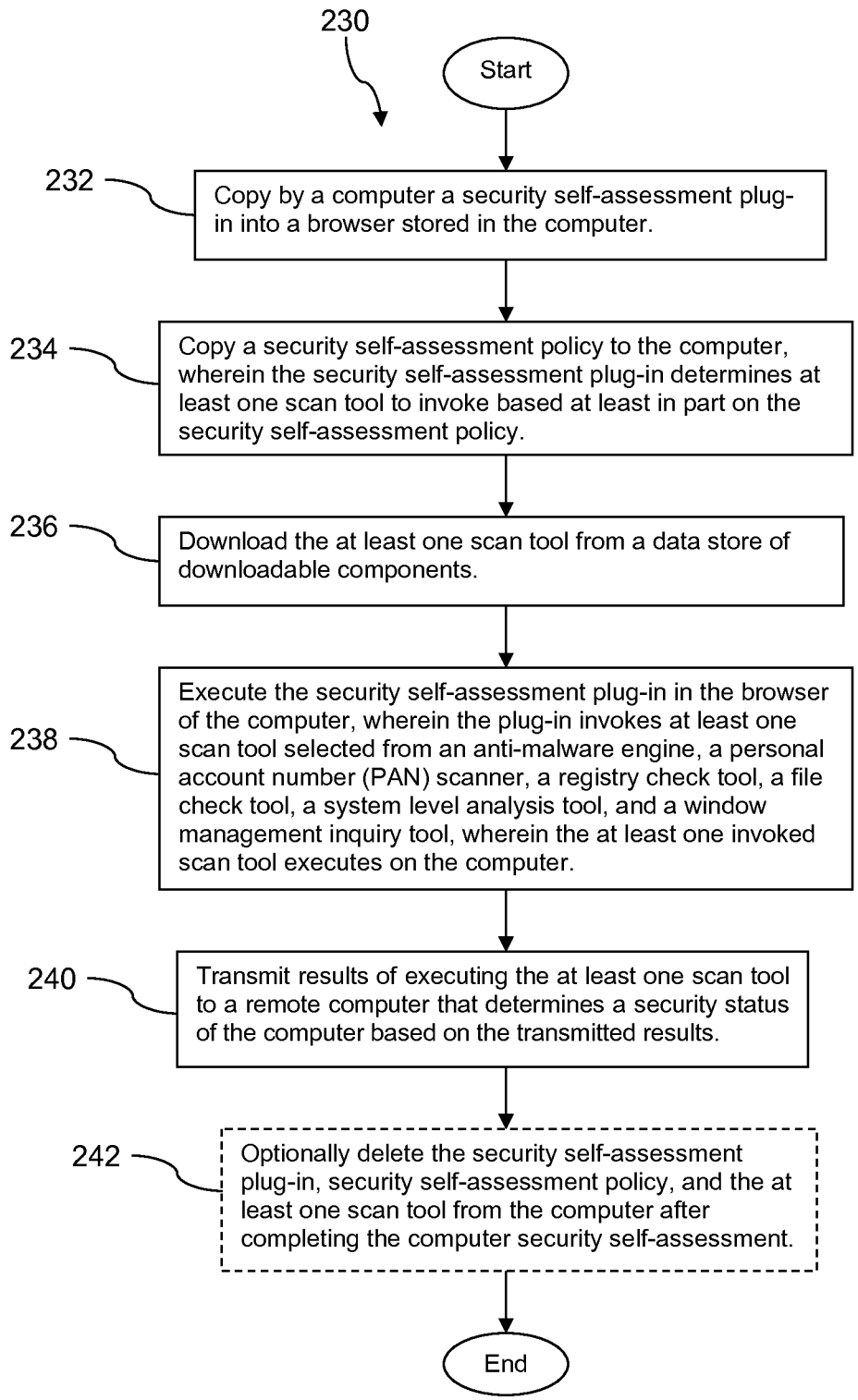
FIG. 2 is a flow chart of a method according to an embodiment of the disclosure.

Turning now to FIG. 2, a method 230 is described. At block 232, a computer copies a security self-assessment plug-in into a browser stored in the computer. The computer is the computer whose security is to be assessed, for example the computer that is to perform a security self-assessment. A user of the computer may attempt to access an enterprise web application, and the enterprise web application may issue a call to action to the computer, asking the computer to accept installation of the security self-assessment plug-in and/or self-assessment logic. When the user approves installation and/or copying of the security self-assessment browser plug-in, the plug-in is copied into the subject browser of the computer. In an alternative embodiment, when the user attempts to access the enterprise web application, the browser of the computer may check to determine if a native mobile application for security self-assessment is installed. If the native mobile application is not installed, the browser may download the native mobile application. The installed native mobile application for security self-assessment is then executed and provides functionality similar to the security self-assessment plug-in and/or self-assessment logic.

At block 234, a security self-assessment policy is copied to the computer, wherein the security self-assessment plug-in, the native mobile application, or the self-assessment logic determines at least one scan tool to invoke based at least in part on the security self-assessment policy. At block 236, the at least one scan tool is downloaded from a data store of downloadable components. The at least one scan tool that is downloaded may be selected based in part on the security self-assessment policy and based in part on a configuration of the computer to which the security self-assessment plug-in, the native mobile application, and/or the self-assessment logic has been copied, for example based on hardware versions, software versions, application versions, and the like.

At block 238, the security self-assessment plug-in, the native mobile application, and/or the self-assessment logic is executed by the computer, wherein the plug-in, the native mobile application, and/or the self-assessment logic invokes at least one scan tool selected from an anti-malware engine, a data discovery engine, a primary account number (PAN) scanner, a social security number scanner, a medical records scanner, a registry check tool, a file check tool, a system level analysis tool, and a window management inquiry tool, wherein the invoked scan tools execute on the computer. Scan tools are described further above. In an embodiment, a vulnerability assessment engine may also be invoked to execute on the computer.

At block 240, results of executing the at least one scan tool and/or the vulnerability assessment engine are transmitted to a remote computer, for example, the self-assessment server 104, that determines a security status of the computer based on the transmitted results. At block 242, the security self-assessment plug-in, the native mobile application, and/or the self-assessment logic; the self-assessment policies; and the scan tools optionally are deleted from the computer after completing the computer security self-assessment. Alternatively, in an embodiment, one or more of the security self-assessment plug-in, the native mobile application, and/or the self-assessment logic; the self-assessment policies; and/or the scan tools are not deleted from the computer after completing the computer security self-assessment and remain stored on the computer for potential use during a future security self-assessment. When these artifacts remain on the computer, a future security self-assessment may first determine whether the subject artifacts are outdated and may request updated items before conducting the security self-assessment. The security self-assessment server 104 may analyze the results and generate a report that it sends to various stakeholders. The security self-assessment server 104 may further take action based on the report and/or based on a pass/fail security self-assessment status.

Figure 3:
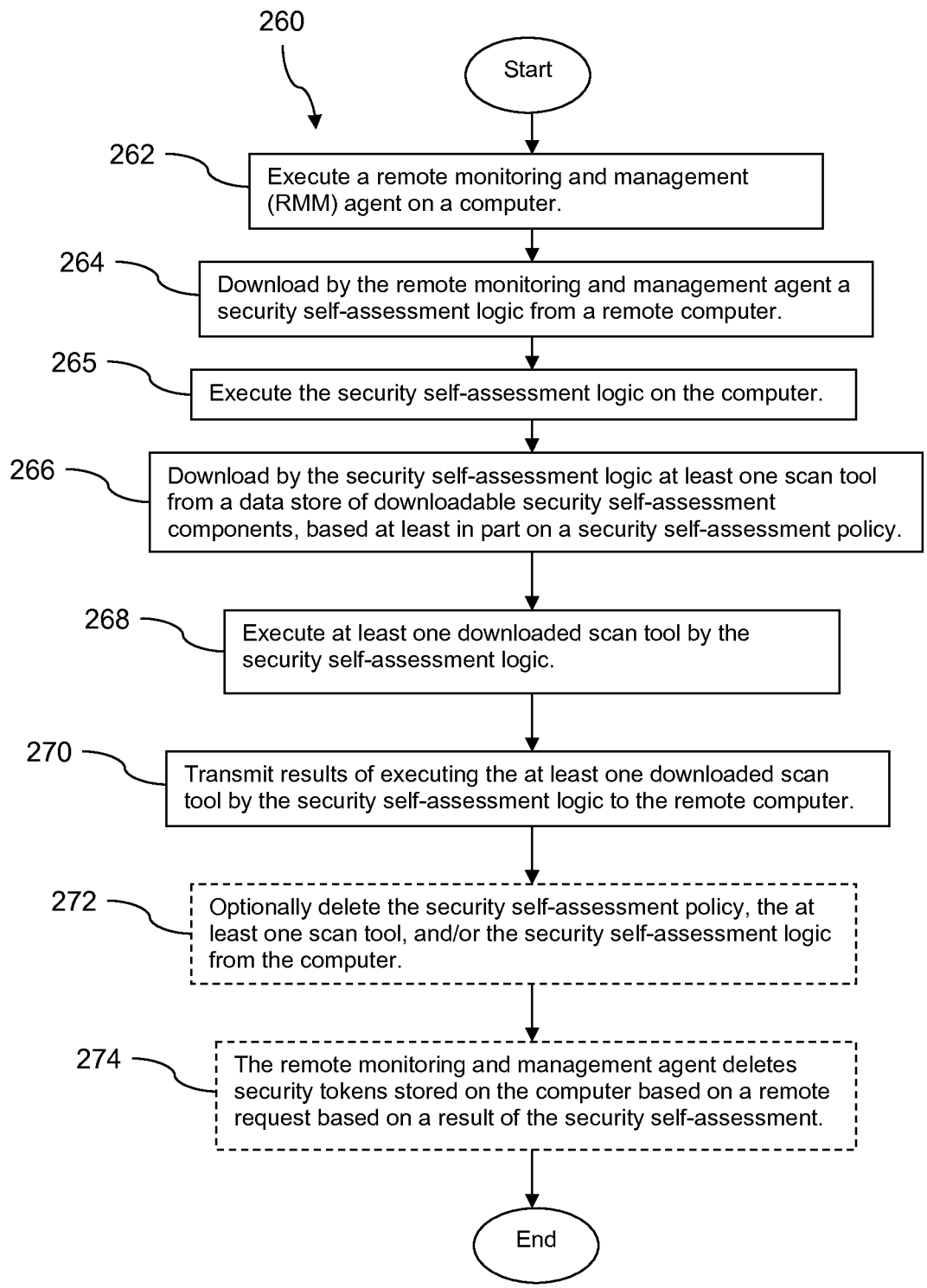
FIG. 3 is a flow chart of another method according to an embodiment of the disclosure.

Turning now to FIG. 3, a method 260 is described. At block 262, a remote monitoring and management (RMM) agent is executed on a computer. At block 264, the remote monitoring and management agent downloads a security self-assessment logic from a remote computer. At block 265, the security self-assessment is executed on the computer. In an embodiment, the security self-assessment logic may download a security self-assessment policy. Alternatively, the security self-assessment policy information may be encoded in or stored in the security self-assessment logic.

At block 266, the security self-assessment logic downloads at least one scan tool from a data store of downloadable security self-assessment components, based at least in part on the security self-assessment policy and/or based on security self-assessment policy information encapsulated within the security self-assessment logic. Alternatively, in an embodiment, at block 266, the security self-assessment logic downloads at least three security assessment tools selected from an anti-malware engine, a data discovery engine, a registry check tool, a file check tool, a system level analysis tool, a window management inquiry tool, or a vulnerability assessment engine from a data store of downloadable security assessment components, based at least in part on the security self-assessment policy and/or based on security self-assessment policy information encapsulated within the security self-assessment logic.

At block 268, the at least one downloaded scan tool is executed by the security self-assessment logic. In an embodiment, the at least one downloaded scan tool is executed with permissions of a local user of the computer. Alternatively, the at least three security assessment tools are executed by the security self-assessment logic. Executing the one or more downloaded scan tools or security assessment tools produces results, for example results of the security scans and/or vulnerability assessments. The results may comprise pass or fail values. The results may comprise a metric that represents the results using a range of possible values, for example a range of values from 0 to 1, from 0 to 10, from 0 to 100, from 1 to 10, from 1 to 100, or some other numerical range. The results may take other forms.

At block 270, the results of executing the at least one downloaded scan tool are transmitted by the security self-assessment logic to the remote computer. Alternatively, the results of executing the at least three security assessment tools are transmitted by the security self-assessment logic to the remote computer. At block 272, the security self-assessment policy, the at least one scan tool, and/or the security self-assessment logic optionally are deleted from the computer. In an embodiment, one or more of the security self-assessment policy, the at least one scan tool, and/or the security self-assessment logic may not be deleted from the computer and may be retained in a memory of the computer for possible use in a future security self-assessment process. At block 274, action is optionally taken in response to the completion of a security self-assessment. For example, the remote monitoring and management agent deletes security tokens stored on the computer based on a remote request based on a result of the security self-assessment. Alternatively some other action may be taken based on the completion of the security self-assessment. For example, a report summarizing the results of the security self-assessment may be transmitted and/or emailed to stakeholder such as a security administrator and/or others.

Figure 4:
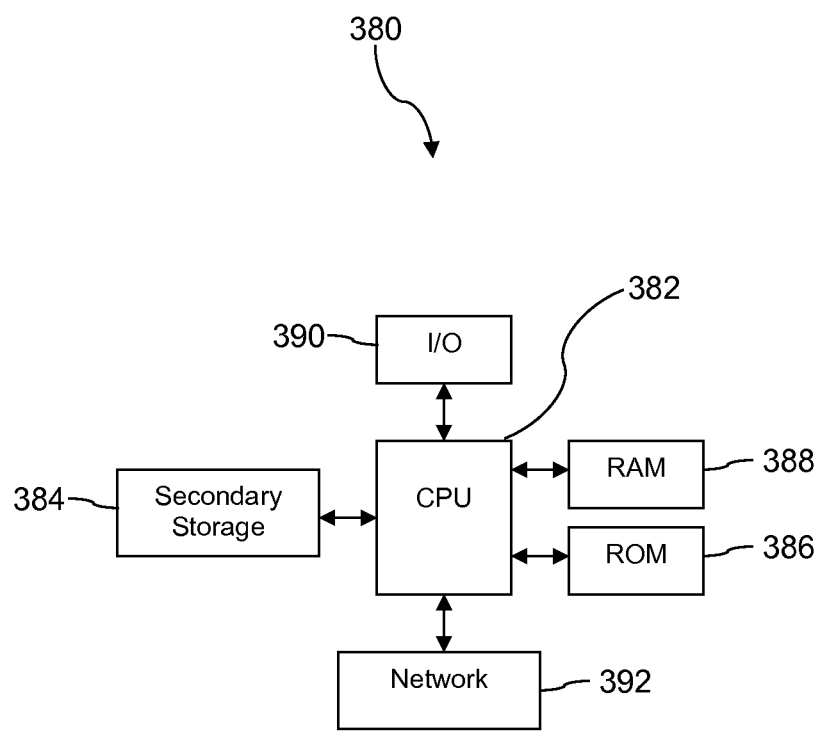
FIG. 4 is an illustration of a computer system according to an embodiment of the disclosure.

FIG. 4 illustrates a computer system 380 suitable for implementing one or more embodiments disclosed herein. Either the computing device 102 or the self-assessment server 104 may be implemented substantially in the form of the computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Having described the system and method herein, various embodiments may include, but are not limited to:

In an embodiment, a system for security self-assessment of a computer platform comprises a memory, a processor, and an application stored in the memory. When it is executed by the processor of the computer and in association with a call to action, the application transmits security self-assessment logic and at least one security self-assessment policy to a computer platform, wherein the security self-assessment policy defines at least one scan tool to be used by the security self-assessment logic when executed on the computer platform to perform a security self-assessment of the computer platform. The system further comprises a plurality of scan tools stored in the memory and accessible for downloading by security self-assessment logic when executed on the computer platform. The security self-assessment logic is configured to cause a processor of the computer platform to download to the computer platform the at least one scan tool defined by the security self-assessment policy from the plurality of scan tools stored in the memory, to perform a security self-assessment of the computer platform based at least in part on the downloaded at least one scan tool, to remove the at least one downloaded scan tool from the computer platform, to remove the security self-assessment policy from the computer platform, and to remove the security self-assessment logic from the computer platform when the self-assessment of the computer platform has performed. In an alternative embodiment, fewer than all of the downloaded scan tool or tools, the security self-assessment policy, and the security self-assessment logic are removed from the computer platform and at least some one or more of these are left installed, loaded, or stored on the computer platform, for example stored in the memory. The system may be an opportunistic scanning system, wherein the security self-assessment logic is opportunistic scanning logic and wherein the at least one security self-assessment policy is at least one opportunistic scanning policy. In an embodiment, the at least one scan tool may be an opportunistic scan tool. The security self-assessment logic may be transmitted at least in part as one of a web browser plug-in to the computer platform, a native mobile application of the computer platform, a command line interface of a shell of the computer platform, or a remote monitoring and management (RMM) agent of the computer platform. The scan tools may comprise at least one of an anti-malware engine, data discovery engine, registry check tool, file check tool, system level analysis tool, window management inquiry tool, or a vulnerability assessment engine. The application may receive results from the computer platform when the computer platform executes the security self-assessment logic, analyze the results to determine a security status of the computer platform, and report the security status of the computer platform to stakeholders. The application may receive results from the computer platform when the computer platform executes the security self-assessment logic, analyze the results to determine a security status of the computer platform, and take action based on the security status of the computer platform. The action may be one or more of deleting security tokens from the computer platform, adding the computer platform to a black list of a firewall, or providing instructions to the computer platform on how to correct a security vulnerability of the computer platform.

In an embodiment, a method of computer security self-assessment comprises copying to a computer one of a security self-assessment plug-in into a browser stored in the computer or a security self-assessment native mobile application. The method further comprises executing by the computer one of the security self-assessment plug-in or the security self-assessment native mobile application. If the computer executes the security self-assessment plug-in, the plug-in invokes at least one scan tool selected from a vulnerability assessment engine, an anti-malware engine, a data discovery engine, a registry check tool, a file check tool, a system level analysis tool, and a window management inquiry tool, wherein the invoked scan tools execute on the computer. On the other hand, if the computer executes the security self-assessment native mobile application, the security self-assessment native mobile application invokes at least one scan tool selected from a vulnerability assessment engine, an anti-malware engine, a data discovery engine, a registry check tool, a file check tool, a system level analysis tool, and a window management inquiry tool, wherein the invoked scan tools execute on the computer. The method further comprises transmitting results of executing the at least one scan tool to a remote computer that determines a security status of the computer based on the transmitted results. The security self-assessment plug-in may an opportunistic security self-assessment plug-in or the security self-assessment native mobile application may be an opportunistic self-assessment native mobile application. The at least one scan tool may be executed with permissions of a local user of the computer. The method may comprise copying a security self-assessment policy to the computer, wherein the security self-assessment plug-in may determine what scan tools to invoke based at least in part on the security self-assessment policy. Alternatively, if the security self-assessment native mobile application is executed by the computer, the security self-assessment native mobile application may determine what scan tools to invoke based at least in part on the security self-assessment policy. The method may comprise the security self-assessment plug-in or the security assessment native mobile application downloading the scan tools from a data store of downloadable components. The method may comprise deleting from the computer the security self-assessment plug-in or the security self-assessment native mobile application and may comprise deleting the at least one security scanning tool pursuant to completion of the computer security self-assessment. The method may comprise accessing an enterprise web page, receiving a command from the enterprise web page to download the security self-assessment mobile application, downloading the security self-assessment mobile application from a downloadable components store; and installing the security self-assessment mobile application on the computer.

In an embodiment, a method of computer security self-assessment comprises executing a remote monitoring and management (RMM) agent on a computer and downloading by the remote monitoring and management agent a security self-assessment logic from a remote computer. The method further comprises the security self-assessment logic downloading at least three security assessment tools selected from an anti-malware engine, a data discovery engine, a registry check tool, a file check tool, a system level analysis tool, a window management inquiry tool, or a vulnerability assessment engine from a data store of downloadable security assessment components, based at least in part on a security self-assessment policy. The method further comprises executing at least three security assessment tools by the self-assessment logic and transmitting results of executing the at least three security assessment tools by the self-assessment logic to the remote computer. By performing and/or executing this method, the computer performs a security self-assessment. The remote monitoring and management agent may be triggered to execute from a remote computer. The at least three security assessment tools may be executed with permissions of a local user of the computer. The method may comprises deleting one or more of the security self-assessment policy, the at least three security assessment tools, and the security self-assessment logic from the computer. The vulnerability assessment engine may comprise an open vulnerability assessment language (OVAL) engine, wherein the OVAL engine incorporates instructions provided by one of an enterprise, a government agency, a credit card issuer, or a financial services institution. The method may comprise deleting security tokens stored on the computer based on a command from a remote computer pursuant to transmitting the results.

In an embodiment, a system for security self-assessment comprises a memory, a processor, an application stored in the memory, and a plurality of scan tools stored in the memory. When the processor executes the application and in association with a call to action, the application transmits security self-assessment logic and at least one security self-assessment policy to a computer platform. The security self-assessment policy defines at least one scan tool to be used by the security self-assessment logic when executed on the computer platform to perform a security self-assessment of the computer platform. The scan tools are accessible for downloading by security self-assessment logic when executed on the computer platform. In an embodiment, the system for security self-assessment for a computer may be an opportunistic scanning system, wherein the security self-assessment logic may be opportunistic scanning logic and wherein the at least one security self-assessment policy may be at least one opportunistic scanning policy. The security self-assessment logic may be transmitted at least in part as a web browser plug-in to the computer platform. Alternatively, the security self-assessment logic may be transmitted at least in part as a native mobile application of the computer platform. Alternatively, the security self-assessment logic may be transmitted at least in part as a command line interface of a shell of the computer platform. Alternatively, the security self-assessment logic may be transmitted at least in part as a portion of a remote monitoring and management agent of the computer platform. The scan tools may comprise at least one of an anti-malware engine, a primary account number (PAN) scanner, registry check tool, file check tool, system level analysis tool, window management inquiry tool, or a vulnerability assessment engine. The scan tools may further comprise a vulnerability assessment engine. The vulnerability assessment engine may comprise an open vulnerability assessment language (OVAL) engine, wherein the OVAL engine incorporates instructions provided by one of an enterprise, a government agency, a credit card issuer, or a financial services institution. The application may receive results from the computer platform when the computer platform executes the security self-assessment logic, analyzes the results to determine a security status of the computer platform, and reports the security status of the computer platform to stakeholders. The application may receive results from the computer platform when the computer platform executes the security self-assessment logic, analyzes the results to determine a security status of the computer platform, and takes action based on the security status of the computer platform. The action taken by the application may be one or more of deleting security tokens from the computer platform, adding the computer platform to a black list of a firewall, or providing instructions to the computer platform on how to correct a security vulnerability of the computer platform.

In an embodiment, a method of computer security self-assessment comprises copying by a computer a security self-assessment plug-in into a browser stored in the computer. The method further comprises executing the security self-assessment plug-in by the computer, wherein the plug-in invokes at least one scan tool selected from an anti-malware engine, a personal account number (PAN) scanner, a registry check tool, a file check tool, a system level analysis tool, and a window management inquiry tool, wherein the invoked scan tools execute on the computer. The method further comprises transmitting results of executing the at least one scan tool to a remote computer that determines a security status of the computer based on the transmitted results. The security self-assessment plug-in may be an opportunistic security self-assessment plug-in. The at least one scan tool may be executed with permissions of a local user of the computer. The security self-assessment plug-in may further invoke an open vulnerability assessment language (OVAL) engine, wherein the OVAL engine incorporates instructions provided by one of an enterprise, a government agency, a credit card issuer, or a financial services institution. The method may further comprise copying a security self-assessment policy to the computer, wherein the security self-assessment plug-in determines what scan tools to invoke based at least in part on the security self-assessment policy. The at least one scan tool invoked by the security self-assessment plug-in may be encapsulated in the security self-assessment plug-in. The security self-assessment plug-in may download the scan tools from a data store of downloadable components. The method may further comprise deleting the security self-assessment plug-in and the at least one security scanning tool from the computer after completing the computer security self-assessment.

In an embodiment, a method of computer security self-assessment comprises executing a remote monitoring and management (RMM) agent on a computer, downloading by the remote monitoring and management agent a security self-assessment logic from a remote computer, downloading by the security self-assessment logic at least one scan tool from a data store of downloadable security scanning components, based at least in part on a security self-assessment policy, executing at least one downloaded scan tool by the self-assessment logic, and transmitting results of executing the at least one downloaded scan tool by the self-assessment logic to the remote computer. By performing and/or executing this method, the computer may perform a security self-assessment. The remote monitoring and management agent may be triggered to execute from a remote computer. The least one downloaded scan tool may be executed with permissions of a local user of the computer. The method may further comprise deleting one or more of the security self-assessment policy, the at least one downloaded scan tool, and the security self-assessment logic from the computer. The at least one scan tool may comprise an anti-malware engine, a primary account number (PAN) scanner, registry check tool, file check tool, system level analysis tool, window management inquiry tool, or a vulnerability assessment engine. The at least one scan tool further may comprise a vulnerability assessment engine, and the security self-assessment logic executes the vulnerability assessment engine. The vulnerability assessment engine may comprise an open vulnerability assessment language (OVAL) engine, wherein the OVAL engine incorporates instructions provided by one of an enterprise, a government agency, a credit card issuer, or a financial services institution. The method may further comprise the remote monitoring and management agent deleting security tokens stored on the computer based on a remote request based on a result of the security self-assessment.

In an embodiment, a method of computer security self-assessment comprises copying by a computer a security self-assessment native application to the computer and executing the security self-assessment native application by the computer, wherein the security self-assessment native application invokes at least one scan tool selected from an anti-malware engine, a personal account number (PAN) scanner, a registry check tool, a file check tool, a system level analysis tool, and a window management inquiry tool, wherein the invoked scan tools execute on the computer. The method further comprises transmitting results of executing the at least one scan tool to a remote computer that determines a security status of the computer based on the transmitted results. The security self-assessment native mobile application may promote opportunistic security scanning. The at least one scan tool may be executed with permissions of a local user of the computer. The security self-assessment native mobile application may further invokes an open vulnerability assessment language (OVAL) engine, wherein the OVAL engine incorporates instructions provided by one of an enterprise, a government agency, a credit card issuer, or a financial services institution. The method may further comprise copying a security self-assessment policy to the computer, wherein the security self-assessment native mobile application determines what scan tools to invoke based at least in part on the security self-assessment policy.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of computer security self-assessment, comprising:
receiving, by a personal computing device, an input selecting access to an enterprise application, wherein the personal computing device is a bring-your-own-device;
selecting, by the personal computing device, access to the enterprise application;
when the personal computing device does not have a security self-assessment native mobile application installed thereon and the personal computing device comprises a mobile phone operating system then:
receiving, by the personal computing device, a request from the enterprise application for approval to install the security self-assessment native mobile application on the personal computing device;
responsive to the request, receiving approval to install the security self-assessment native mobile application; and
responsive to the approval, copying the security self-assessment mobile native application to the personal computing device;
when the personal computing device does not have the security self-assessment native mobile application installed thereon and the personal computing device does not comprise a mobile phone operating system then:
receiving, by the personal computing device, a request from the enterprise application for approval to install a security self-assessment browser plug-in on the personal computing device;
responsive to the request, receiving approval to install the security self-assessment browser plug-in; and
responsive to the approval, copying the security self-assessment plug-in into a browser stored in the personal computing device;
when the personal computing device has the security self-assessment native mobile application installed thereon, determining whether one or more of a plurality of scan tools stored on the personal computing device and associated with the security self-assessment native mobile application are outdated, wherein the plurality of scan tools comprise a data discovery engine including a primary account number scan tool that detects credit card numbers stored on the personal computing device and a social security number scan tool that detects social security numbers stored on the personal computing device and a vulnerability assessment engine including a registry check tool and a file check tool; and when the one or more of the plurality of scan tools are determined to be outdated, receiving, by the personal computing device, one or more updated scan tools to replace the one or more of the plurality of scan tools stored on the personal computing device;

installing or copying each of the plurality of scan tools on the personal computing device;

subsequently executing, by the personal computing device, the security self-assessment native mobile application or the security self-assessment plug-in, wherein the security self-assessment native mobile application or the security self-assessment plug-in invokes the plurality of scan tools, and wherein the invoked plurality of scan tools executes on the personal computing device; and transmitting results of executing the plurality of scan tools to a remote computer that assesses a security compliance of the personal computing device with electronic information security regulations or policies based on the transmitted results.

2. The method of claim 1, wherein the security self-assessment plug-in is an opportunistic security self-assessment plug-in or the security self-assessment native mobile application is an opportunistic security self-assessment native mobile application.

3. The method of claim 1, wherein the plurality of scan tools is executed with permissions of a local user of the personal computing device.

4. The method of claim 1, further comprising copying a security self-assessment policy to the personal computing device, wherein the security self-assessment plug-in determines which scan tools to invoke based at least in part on the security self-assessment policy.

5. The method of claim 1, wherein the security self-assessment plug-in or the security assessment native mobile application downloads the plurality of scan tools from a data store of downloadable components.

6. The method of claim 1, further comprising deleting from the personal computing device the security self-assessment plug-in or the security self-assessment native mobile application and the plurality of scanning tools pursuant to completion of the personal computing device security self-assessment.

7. A method of computer security self-assessment, comprising:

receiving a request to access an enterprise application from a personal computing device, wherein the personal computing device is a bring-your-own-device;

when the personal computing device does not have a security self-assessment native mobile application installed thereon and the personal computing device comprises a mobile phone operating system then:

sending a request for approval to install the security self-assessment native mobile application on the personal computing device;

responsive to the request, receiving approval to install the security self-assessment native mobile application; and response to the approval, sending, by a self-assessment server, the security self-assessment mobile native application to the personal computing device;

when the personal computing device does not have the security self-assessment native mobile application installed thereon and the personal computing device does not comprise a mobile phone operating system then:

sending a request for approval to install a security self-assessment browser plug-in on the personal computing device;

responsive to the request, receiving approval to install the security self-assessment browser plug-in; and responsive to the approval, sending, by the self-assessment server, the security self-assessment plug-in into a browser stored in the personal computing device;

when the personal computing device has the security self-assessment native mobile application installed thereon, determining whether one or more of a plurality of scan tools stored on the personal computing device and associated with the security self-assessment native mobile application are outdated, wherein the plurality of scan tools comprise a data discovery engine including a primary account number scan tool that detects credit card numbers stored on the personal computing device and a social security number scan tool that detects social security numbers stored on the personal computing device and a vulnerability assessment engine including a registry check tool and a file check tool; and when the one or more of the plurality of scan tools are determined to be outdated, sending, by the self-assessment server, one or more updated scan tools to the personal computing device to replace the one or more of the plurality of scan tools; and receiving, by the self-assessment server, results of the personal computing device executing the security self-assessment native mobile application or the security self-assessment plug-in, wherein each of the plurality of scan tools is installed or copied on the personal computing device prior to being invoked, wherein the security self-assessment native mobile application or the security self-assessment plug-in invokes the plurality of scan tools, which execute on the personal computing device, and wherein the self-assessment server assesses a security compliance of the personal computing device with electronic information security regulations or policies based on the results.

8. The method of claim 7, wherein the security self-assessment plug-in is an opportunistic security self-assessment plug-in or the security self-assessment native mobile application is an opportunistic security self-assessment native mobile application.

9. The method of claim 7, further comprising transmitting an assessment of the security compliance of the personal computing device to stakeholders.

10. The method of claim 7, wherein when the personal computing device fails an assessment of the security compliance of the personal computing device, at least one of deleting security tokens from the personal computing device or adding the personal computing device to a black list of a firewall.

11. The method of claim 7, wherein the plurality of scan tools is executed with permissions of a local user of the personal computing device.

12. The method of claim 7, further comprising deleting one or more of the plurality of scan tools from the personal computing device.

13. A method of computer security self-assessment, comprising:

receiving a request to access an enterprise application from a computing device, wherein the computing device is a bring-your-own-device or an enterprise computing device;

when the computing device does not have a security self-assessment native mobile application installed thereon and the computing device comprises a mobile phone operating system then:
sending a request for approval to install the security self-assessment native mobile application on the computing device;
responsive to the request, receiving approval to install the security self-assessment native mobile application; and
responsive to the approval, sending, by a self-assessment server, the security self-assessment mobile native application to the computing device;

when the computing device does not have the security self-assessment native mobile application installed thereon and the computing device does not comprise a mobile phone operating system then:
sending a request for approval to install a security self-assessment browser plug-in on the computing device;
responsive to the request, receiving approval to install the security self-assessment browser plug-in; and
responsive to the approval, sending, by the self-assessment server, the security self-assessment plug-in into a browser stored in the computing device;

when the computing device has the security self-assessment native mobile application installed thereon,
determining whether one or more of a plurality of scan tools stored on the computing device and associated with the security self-assessment native mobile application are outdated, wherein the plurality of scan tools comprise a data discovery engine including a primary account number scan tool that detects credit card numbers stored on the personal computing device and a social security number scan tool that detects social security numbers stored on the personal computing device and a vulnerability assessment engine including a registry check tool and a file check tool; and
when the one or more of the plurality of scan tools are determined to be outdated, sending, by the self-assessment server, one or more updated scan tools to the computing device to replace the one or more of the plurality of scan tools; and
receiving, by the self-assessment server, results of the computing device executing the security self-assessment native mobile application or the security self-assessment plug-in, wherein each of the plurality of scan tools is installed or copied on the computing device prior to being invoked, wherein the security self-assessment native mobile application or the security self-assessment plug-in invokes the plurality of scan tools, which execute on the personal computing device, and wherein the self-assessment server assesses a security compliance of the computing device with electronic information security regulations or policies based on the results.

14. The method of claim 13, wherein the security self-assessment plug-in is an opportunistic security self-assessment plug-in or the security self-assessment native mobile application is an opportunistic security self-assessment native mobile application.

15. The method of claim 13, further comprising transmitting an assessment of the security compliance of the computing device to stakeholders.

16. The method of claim 13, wherein when the computing device fails an assessment of the security compliance of the computing device, at least one of deleting security tokens from the computing device or adding the computing device to a black list of a firewall.

17. The method of claim 13, wherein the plurality of scan tools is executed with permissions of a local user of the computing device.

18. The method of claim 13, further comprising deleting one or more of the plurality of scan tools from the computing device.

19. The method of claim 13, further comprising deleting the security self-assessment native mobile application or the security self-assessment plug-in from the computing device.

20. The method of claim 13, wherein the computing device is a point-of-sale terminal.

* * * * *